US011646459B2

(12) United States Patent
Schiemann et al.

(10) Patent No.: US 11,646,459 B2
(45) Date of Patent: May 9, 2023

(54) RECOMBINATION SYSTEM HAVING A RECOMBINATION DEVICE

(71) Applicant: BAE BATTERIEN GMBH, Berlin (DE)

(72) Inventors: Michael Schiemann, Falkensee (DE); Julia-Beatrix Ross, Berlin (DE)

(73) Assignee: BAE BATTERIEN GMBH, Berlin (DE)

( * ) Notice: Subject to any disclaimer, the term of this patent is extended or adjusted under 35 U.S.C. 154(b) by 0 days.

(21) Appl. No.: 17/265,645

(22) PCT Filed: Aug. 5, 2019

(86) PCT No.: PCT/EP2019/071012
§ 371 (c)(1),
(2) Date: Feb. 3, 2021

(87) PCT Pub. No.: WO2020/030583
PCT Pub. Date: Feb. 13, 2020

(65) Prior Publication Data
US 2021/0305636 A1    Sep. 30, 2021

(30) Foreign Application Priority Data
Aug. 8, 2018   (DE) .................... 10 2018 119 301.7

(51) Int. Cl.
*H01M 10/00*    (2006.01)
*H01M 10/52*    (2006.01)
(52) U.S. Cl.
CPC ............................. *H01M 10/523* (2013.01)
(58) Field of Classification Search
CPC ... Y02W 60/10; H01M 50/35; H01M 10/342; H01M 10/523; Y02E 60/10
See application file for complete search history.

(56) References Cited

U.S. PATENT DOCUMENTS 6,254,841 B1 *  7/2001  Kesper ................. H01M 10/52
                                                   429/57
7,722,834 B2    5/2010  Riegel et al.
(Continued)

FOREIGN PATENT DOCUMENTS

EP    1 674 424 A1    6/2006
EP    1 780 826 A1    5/2007
(Continued)

OTHER PUBLICATIONS

International Search Report dated Oct. 23, 2019, in connection with PCT International Application No. PCT/EP2019/071012.
(Continued)

*Primary Examiner* — Cynthia H Kelly
*Assistant Examiner* — Monique M Wills
(74) *Attorney, Agent, or Firm* — Norris McLaughlin, P.A.

(57) ABSTRACT

Recombination system having a recombination device for catalytically recombining hydrogen and oxygen arising in storage batteries to form water, wherein the recombination device comprises at least one catalyst material in at least one subregion above a center line of the recombination device in relation to a position of a retainer of the recombination system for the recombination device has a first partial amount of the catalyst material, wherein the first partial amount is greater than a second partial amount of the catalyst material, which second partial amount is located originating from the center line of the recombination device toward the retainer.

8 Claims, 4 Drawing Sheets

(56) References Cited

U.S. PATENT DOCUMENTS

| 2003/0113612 A1* | 6/2003 | Jones ............ H01M 50/394 |
| | | 429/57 |
| 2008/0166275 A1 | 7/2008 | Riegel et al. |
| 2016/0020495 A1* | 1/2016 | Koba ............ H01M 10/345 |
| | | 320/107 |

FOREIGN PATENT DOCUMENTS

| WO | 2004/040688 A1 | 5/2004 |
| WO | 2006/048072 A1 | 5/2006 |

OTHER PUBLICATIONS

English translation of International Search Report dated Oct. 23, 2019, in connection with PCT International Application No. PCT/EP2019/071012.

Written Opinion issued in connection with PCT International Application No. PCT/EP2019/071012.

* cited by examiner

Figure 4 ical energy on the basis of electrochemical properties. The application spectrum of lead-acid technology is very broad, starting from simple starter batteries as car power supply and starter motor battery, this technology is also deployed in uninterruptible power supplies in parallel standby operation as backup power supplies, in photovoltaic plants and in traction systems for shop floor material handling vehicles in cycled operations.
RECOMBINATION SYSTEM HAVING A RECOMBINATION DEVICE This application is the U.S. National Stage of International Application No. PCT/EP2019/071012, filed Aug. 5, 2019, which claims foreign priority benefit under 35 U.S.C. § 119 of German Application No. 10 2018 119 301.7, filed Aug. 8, 2018.

The invention relates to a recombination system having a recombination device for catalytically recombining hydrogen and oxygen arising in storage batteries to form water, wherein the recombination device comprises at least one catalyst material in at least one subregion.

Storage batteries are in widespread use and are employed as rechargeable storage devices for electrical energy on the basis of electrochemical properties. The application spectrum of lead-acid technology is very broad, starting from simple starter batteries as car power supply and starter motor battery, this technology is also deployed in uninterruptible power supplies in parallel standby operation as backup power supplies, in photovoltaic plants and in traction systems for shop floor material handling vehicles in cycled operations.

An attribute of sealed lead-acid storage batteries is the loss of water. Due to the electrochemical properties, the water in the electrolyte of the storage battery decomposes into oxygen and hydrogen, causing the electrolyte level in the individual sealed cells to drop, thus mandating a battery space ventilation mechanism. The water decomposition is firstly caused by the low water decomposition voltage (1.223 V water decomposition voltage), and secondly, when the gasification voltage of 2.40 V per cell is exceeded, the electrolysis in lead-acid storage batteries results in water decomposition in conjunction with the rise of gas bubbles.

This causes hydrogen, a gas that is combustible but does not promote combustion, to accumulate on the negative electrode. Conversely, oxygen forms on the positive electrode in the stoichiometric ratio of 1:2. Due to the low solubility of both gases in the electrolyte, the gas bubbles dissipate through the filling and gas dissipation plug.

The two gases can be combined with each other, both within, but also outside of the battery body. Oxygen and hydrogen are recombined into water already at room temperature. But this happens at such a slow, barely measurable speed, that a hydrogen oxygen mixture can be stored for months without the ability to measure a conversion.

In total, the disadvantages of water decomposition for storage battery technologies with aqueous electrolyte, without limitation for lead-acid storage batteries, was already recognized very early (for example by Mr. Edison in 1904), and attempts were made through various development stages to compensate these disadvantages.

For example, it was determined that the recombination process of hydrogen and oxygen gas is accelerated with the assistance of catalysts. Catalysts are generally defined as substances that can increase or decrease the speed of a chemical reaction. Since catalysts are not consumed in the process, they are present in unmodified form at the end of the reaction and are therefore also not shown in the reaction equations of the conversion. The acceleration is realized by reducing the activation energy. The inhibited reaction of oxygen and hydrogen can as a result be accelerated.

The freely-moving hydrogen molecules contact the surfaces of the catalyst material. The freely-moving electrons stored there break the bonds, bond with the individual hydrogen atoms and allow the latter to freely move along the surface. These also freely-moving oxygen molecules land on the platinum surface, and as individual atoms form a bond with respectively two hydrogen atoms. The resulting recombination then generates two water molecules from one oxygen molecule and two hydrogen molecules.

The recombination of oxygen and hydrogen into water releases energy manifested in the form of high heat development (193 kJ/mol), allowing the water molecules to leave the platinum catalyst. The split substances were recombined by recombination with the aid of a catalyst.

Without limitation, external catalytic plugs that rely on this effect were also developed for recombination. When using the recombination system, the hydrogen and oxygen gases arising in the battery during water decomposition are routed into the recombiner, which is arranged on the opening of the lead-acid battery.

Using an integrated precious metal catalyst that is contained in a gas-permeable ceramic, these gases are recombined, resulting in water vapor. The water vapor condensates on the walls of the plug. The forming water droplets flow downward and are routed back to the battery.

As already mentioned, the recombination of hydrogen and oxygen is an exothermal process that releases heat.

The recombiner is installed as an external component on the opening of the e.g. battery lid. All these recombination plugs have in common that the gas-permeable ceramic heats up significantly, depending on the availability of the reaction partners oxygen and hydrogen and the quantity of the catalyst.

The great challenge is to manage this heat in the plug, since the gas-permeable ceramic is typically secured at one or several points. As is already known from many inventions, the active element is typically secured on two sides in a retainer or on one side in a retainer. When the catalyst material is distributed evenly (for example a ceramic oxide coated with palladium), the carrier tube can heat up significantly, causing the carrier/retainer to become thermally unstable. On the other hand, the catalyst content cannot be reduced since this represents a certain minimum quantity that has the effect that the recombination takes place with sufficient efficiency given a corresponding availability of oxygen and hydrogen gas. This presents the question of how the thermal load on the carrier can be reduced without reducing the efficiency of the recombination, while at the same time preventing an overheating of the system.

Various approaches are known from the prior art that only conditionally directly refer to the aforementioned question.

A known gas recombiner is disclosed in EP 1 780 826 B1. Corresponding overpressure and under pressure valves are specified so that the operating efficiency does not decline due to potential overpressure or under pressure. Overpressure in particular is associated with an increased temperature. The recombination device is in this case specified with two centering elements on the bottom end of the housing, wherein direct contact to the bottom end of the housing is thus established. The generated process heat can then be transferred without restrictions from the recombination device to the loadbearing elements.

Publication WO 200 60 48 072 A1 discloses a known recombiner having a recombination device for catalytically recombining hydrogen and oxygen in storage batteries. So that the recombination device is not drenched by the condensing water droplets forming on the inner container wall, it is specified that the recombination device carries a screen element. Although this solution represents an improved process control with the objective of improving efficiency, the focus in this case is not on the problem of the generated process heat, and the solution at best supplies a subordinated aspect to manage the resulting process heat.

The invention is then based on the task to provide a recombination system that ensures improved thermal management in regards to the process heat generated during operation.

A preferred embodiment of the invention specifies a recombination system having a recombination device for catalytically recombining hydrogen and oxygen arising in storage batteries to form water, wherein the recombination device comprises at least one catalyst material in at least one subregion. The at least one subregion above a center line of the recombination device in relation to a position of a retainer of the recombination system for the recombination device has a first partial amount of the catalyst material, the first partial amount being greater than a second partial amount of the catalyst material, which second partial amount is located originating from the center line of the recombination device toward the retainer. A generated process heat can thus be more readily managed, and a thermal load, in particular on the retainer, which can also be referred to as carrier, is reduced, without reducing the efficiency of the recombination, while at the same time preventing the system from overheating. The asymmetric use of the catalyst, which can for example be specified in a tube, significantly reduces the temperature of the fastened side of the recombination device, which can for example comprise a ceramic. By increasing the distance to the retainer, in combination with a correspondingly selected length of the recombination device, for example in the form of a ceramic tube, the recombination mass is on one side oriented away from the attachment base or the retainer, thus significantly reducing the thermal load on the fastener. The catalyst, for example in the form of balls or a rod, is then arranged on one side, and the temperature on the attachment drops. Corresponding tests with the same quantity of the catalyst and the various arrangements demonstrate a noticeable reduction of the thermal load on the retainer or attachment. By using the proposed system, it is then possible to achieve a reduced overheating of the retainer or attachment for the recombination device, for example comprising a gas permeable ceramic with integrated precious metal catalyst, wherein an overall height of the recombination device, for example comprising a ceramic tube, does not change and a constant circumference of the catalyst material is also maintained. In this regard, the quantity of the catalyst remains identical to other arrangements, and only an asymmetrical arrangement of the catalyst in the recombination device, for example comprising a gas-permeable ceramic, causes this technical effect of improved thermal management. A position of the retainer is to be understood as a reference point, so that the first partial amount of the catalyst material is located above a centerline of the recombination device, or is essentially located opposite the retainer. In other words, the first partial amount is specified originating from the position above a centerline of the recombination device.

Other preferred embodiments of the invention are specified by the further features disclosed in the dependent claims.

A further preferred embodiment of the invention specifies that the retainer is arranged in a bottom region of the recombination system. In this case, a main portion of the catalyst or a first partial amount of the catalyst is arranged above a centerline of the recombination device, so that the aforementioned advantages are correspondingly achieved.

A further preferred embodiment of the invention also specifies that the retainer is arranged in a ceiling region of the recombination system. In this case, a main portion of the catalyst or a first partial amount of the catalyst is arranged below a centerline in relation to an installation orientation of the recombination device, so that the aforementioned advantages are correspondingly achieved. In this case, it can also be additionally prevented that condensation water drips onto the recombination device, and the efficiency of the latter degrades because components of the recombination device are wetted with condensation water. The recombination device can for example comprise a ceramic tube or an element with integrated precious metal condenser, wherein these components are not mounted to a base of the recombination system, but are mounted directly under a lid of the recombination system. Based on this approach, an additional shielding element for the condensation water can be omitted, which reduces costs.

Moreover, in addition to the asymmetric design of the catalyst material, this form of suspension is generally thermally more favorable. The risk of increased heat development during an extreme recombination and an extreme overheating, which would result in the destruction of the recombination system, can thus be counteracted. In other words, suspending the recombination device with the for example ceramic, porous tube or element with integrated precious metal condenser results in thermally more favorable conditions, so that the heat buildup is significantly reduced and the heat can be more readily evacuated.

A further preferred embodiment of the invention additionally specifies that the retainer is arranged on a locking element of the recombination system, wherein the locking element comprises at least one guide element, so that a process medium, in particular water, is guided by the guide element toward at least one subregion of the inner region of the recombination system. Yet another advantage of this type of suspension of the recombination device, which for example comprises the tube or element made of a ceramic material with integrated precious metal condenser, is that droplets of condensing water dripping from the upper region of the recombination system, for example from a locking element for example in the form of a plug, and a sealing of the recombination device, for example a ceramic, is no longer possible. In order to facilitate this effect, it can also be specified that for example parts of the recombination device in the form of a ceramic, porous tube with stainless steel condenser are additionally fastened in the upper region, wherein this can occur on a dome of the recombination system or on an external plug that is designed for use in a recombination system. Both the dome and also the plug can in their interior have a circular cone or also other favorable shapes for routing away the condensing water in order to improve routing away the condensing water. The locking element can then also be specified as a single piece in a dome of the recombination system.

A further preferred embodiment of the invention additionally specifies that the recombination device comprises at least one tapered region designed to be joined to the retainer on at least one side of the retainer. The tapered region can then be particularly well specified for a secure and stable connection.

A further preferred embodiment of the invention additionally specifies that the retainer has at least one region designed to accommodate at least one backfire safety element, and wherein the retainer has at least one securing element designed to be joined with the at least one tapered area of the recombination device. The recombination system can as a result be operated particularly safely. The securing element can for example be a clip. In other word, the suspension of the recombination device can for example be designed in the form of the ceramic tube with catalyst in a special embodiment with a mechanical clip system. The tapered region and the securing element or several of these components in this case represent this clip system, wherein the number and arrangement are adapted to the respective case. The advantages are for example that no additional elements for securing are needed and that the fastening can be realized without glue, since the strength properties of glue could change due to moisture and heat. This is advantageous because no drying time and no long-term sequestration of foreign substances must take place during the processing procedure. The fastening mechanism can therefore have tapered regions that can also be referred to as corresponding recesses. In order to support the strength of the securing mechanism, the recombination device or the ceramic tube and therefore the catalyst can additionally have corresponding bores and/or notches. As already mentioned, the fastening mechanism can be integrated in the dome or can be threaded in as a separate part in the form of a plug.

A further preferred embodiment of the invention additionally specifies that the retainer has an at least labyrinth-like opening designed to functionally join the at least one backfire safety element to the recombination device. In other words, in a special embodiment, the retainer, which can also be integrated with a locking element or plug, can have said labyrinth-like opening in the form of a meander-like canal that decelerates a gas outflow and thus more time remains for the hydrogen/oxygen mixture to penetrate the recombination device in the form of e.g. a ceramic, porous tube with precious metal condenser.

A further preferred embodiment of the invention additionally specifies that the first and second partial amount of the catalyst material are joined to each other. The aforementioned advantages can then be implemented even better.

A further preferred embodiment of the invention additionally specifies that the recombination device comprises a ceramic tube, wherein the first and second partial amount are arranged in the ceramic tube. The aforementioned advantages can then be implemented even better.

A final further preferred embodiment of the invention specifies that a recombination device is provided for use in a recombination system according to claims 1 to 9.

The recombination device comprises an asymmetrically distributed catalyst material, wherein a first partial amount of the catalyst material is larger than a second partial amount and wherein an average distance of the first partial amount to the retainer of the recombination system is greater than an average distance of the second partial amount to the retainer of the recombination system.

The asymmetric use of the catalyst, which can for example be specified in a tube, significantly reduces the temperature of the fastened side of the recombination device, which can for example comprise a ceramic. By increasing the distance to the retainer, in combination with a correspondingly selected length of the recombination device, for example in the form of a ceramic tube, the recombination mass is on one side oriented away from the attachment base or the retainer, thus significantly reducing the thermal load on the fastener. The catalyst, for example in the form of balls or a rod, is then arranged on one side, and the temperature on the attachment drops. Corresponding tests with the same quantity of the catalyst and the various arrangements demonstrate a noticeable reduction of the thermal load on the retainer or attachment.

It is then possible based on the proposed device to achieve a reduced overheating of the retainer of the fastening mechanism for the recombination device, for example comprising a gas-permeable ceramic with integrated precious metal catalyst, wherein an overall height of the recombination device, for example comprising a ceramic tube, does not change and a constant circumference of the catalyst material is also maintained. In this regard, the quantity of the catalyst remains identical to other arrangements, and only an asymmetrical arrangement of the catalyst in the recombination device, for example comprising a gas-permeable ceramic, causes this technical effect of improved thermal management.

Unless stated otherwise in the individual case, the various embodiments of the invention described in this filing can be advantageously combined.

The invention is discussed as follows in exemplary embodiments based on the associated drawings. These show in.

Figure 1:
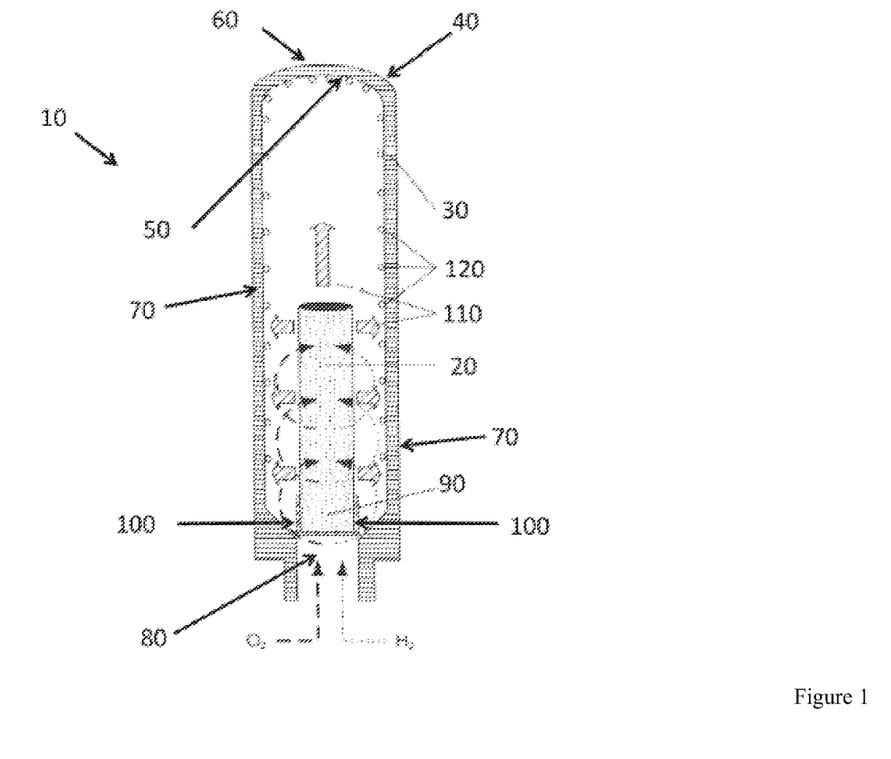
FIG. 1 a recombination system having a recombination device.

FIG. 1 shows a cross-sectional view of a recombination system 10 having a recombination device 20, as it could for example be represented according to the prior art. The recombination system 10 in this case comprises a dome 30 and a recombination device 20. The dome 30 is in this example shown as an essentially rectangular, hollow and cylindrical geometry. The dome 30 in this case has an outer wall 40 and an inner wall 50. In relation to the image plane, the dome 30 has rounded corner regions on top, so that a ceiling region 60 transitions in an arc shape into the side walls 70. Again in relation to the image plane, the dome 30 has an opening region 80 on the bottom into which the $O_2$ and $H_2$ gases flow. These gas flows are each schematically represented with respectively different hatched lines, wherein arrows indicate that these gases flow from below into an interior of the dome 30. A retainer 90 can be seen above the opening region 80. The recombination device 20 is held upright in the retainer 90, which can also be referred to as a securing mechanism. Two jaw elements 100 of the retainer 90 hold the recombination device 20 in an upright position.

The recombination device 20 has an essentially cylindrical geometry. All shown geometries, dimensions and size relationships are to be strictly interpreted as examples and are merely to be understood as a schematic arrangement.

The recombination device 20 is shown in this example as a gas-permeable ceramic having an integrated precious metal catalyst, and can also be referred to as a ceramic tube. The respectively different hatched lines of the two gases are shown as circular shapes in the interior of the dome 30 and point with the arrow tip to the ceramic tube. Block arrows point away from the ceramic tube and visualize the resulting water vapor 110. The water vapor 110 condenses on the inner wall 50 to condensed water 120. In this respect, the dome 30 is designed for condensing the water vapor 110. In the upper region of the dome 30, water vapor 110 also condenses in the ceiling region 60. The gravity principle states that it is possible that condensed water 120 in the form of not shown water droplets falls in the direction of the recombination device 20. Not shown water spots can therefore occur on the recombination device 20. In other words, the ceramic is wetted with condensed water 120, so that the efficiency of the recombination device 20 is reduced as a result.

Figure 2:
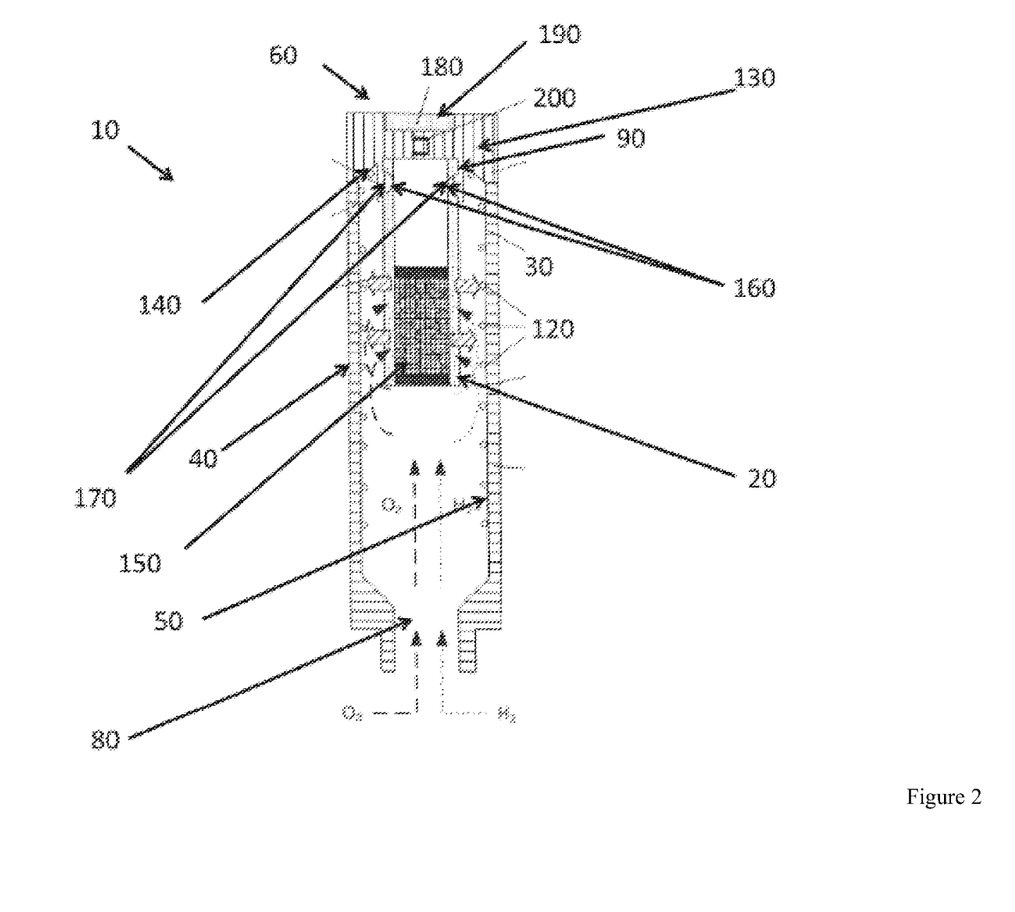
FIG. 2 a recombination system having a recombination device in a retainer in the ceiling region.

FIG. 2 shows a recombination system 10 having a recombination device 20 in a retainer 90 in the ceiling region 60; The retainer is arranged on a locking element 130. The retainer 90 can for example be specified as a single piece with the locking element 130, as is schematically indicated in FIG. 2. The locking element 130 comprises a guide element 140 that has a conical geometry, so that water condensation or condensed water 120 can ultimately be routed to an inner wall 50 by a dome 30 of the recombination system 10. The dome 30 also has an outer wall 40 and in the bottom region comprises an opening region 80, into which the $O_2$ and $H_2$ gases flow. These gas flows are each schematically represented with respectively different hatched lines, wherein arrows indicate that these gases flow from below into an interior of the dome 30. These gases then flow upward and reach the recombination device 20 coming from below. This is indicated in FIG. 2 by hatched lines in the hollow dome 30.

The recombination device 20 is shown as a gas-permeable ceramic with integrated precious metal catalyst, wherein a catalyst material 150 is arranged on the bottom end of the gas-permeable ceramic or the ceramic tube. The catalyst material 150 can for example be a precious metal catalyst. This catalyst material 150 is arranged in the interior of the tube and is largely arranged below an imaginary centerline of the recombination device 20.

In other words, the catalyst material 150 is predominantly specified opposite the retainer 90, and is therefore asymmetrically distributed in the recombination device 20.

The recombination device 20 also has two tapered regions 160 in the upper region. At these locations, the retainer also has two matching securing elements 170. These securing elements 170 are in the form of clips. Together, the tapered regions 160 and the securing elements 170 form a type of clip system, so that the recombination device 20 is held in the upper region in the system 10. The locking element 130 also has a region 180 that is designed to accommodate a backfire safety element 190. Below this region 180, an opening 200 can also be recognized that functionally joins the backfire safety element 190 to the recombination device 20 in the region 180. The backfire safety element 190 could for example be a ceramic frit as a backfire safety mechanism.

Figure 3:
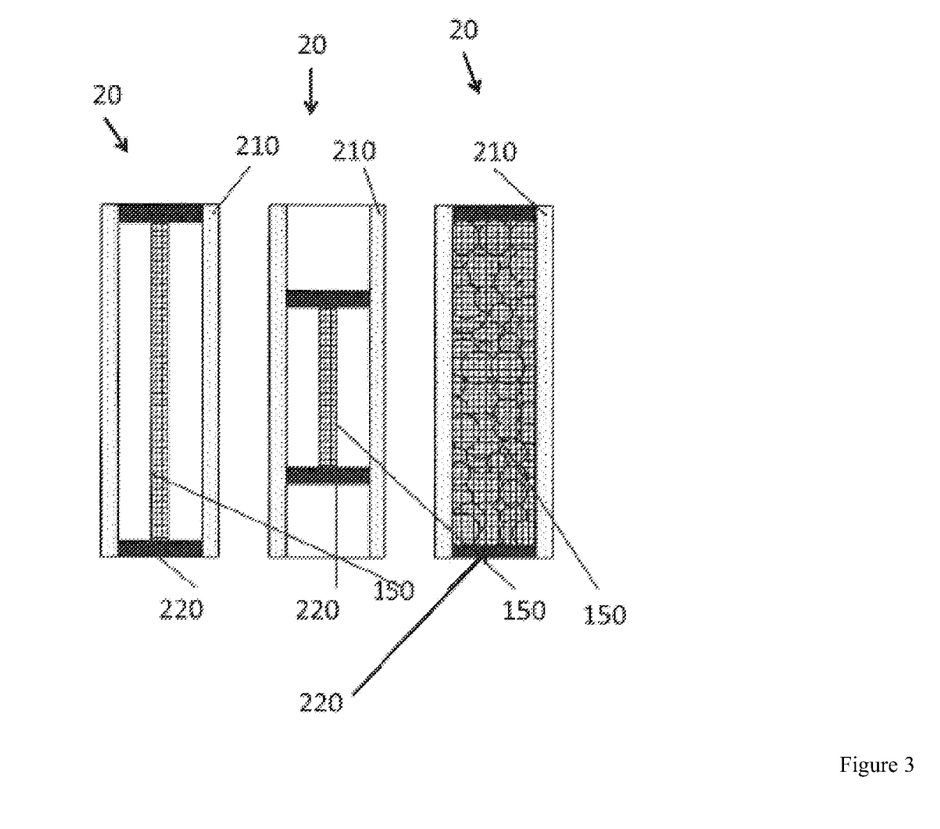
FIG. 3 examples of arrangements of catalyst material in respective recombination devices according to the prior art.

FIG. 3 shows examples of arrangements of catalyst material 150 in respective recombination devices 20 pursuant to the prior art. The respective combination devices 20 in this case have respective ceramic tubes 210 that each have catalyst material 150 in the interior. The respective catalyst material 150 is in this case respectively held in the ceramic tube 210 above and below by a lock 220. The respective catalyst material 150 is in this case respectively specified within the respective ceramic tube 210.

Figure 4:
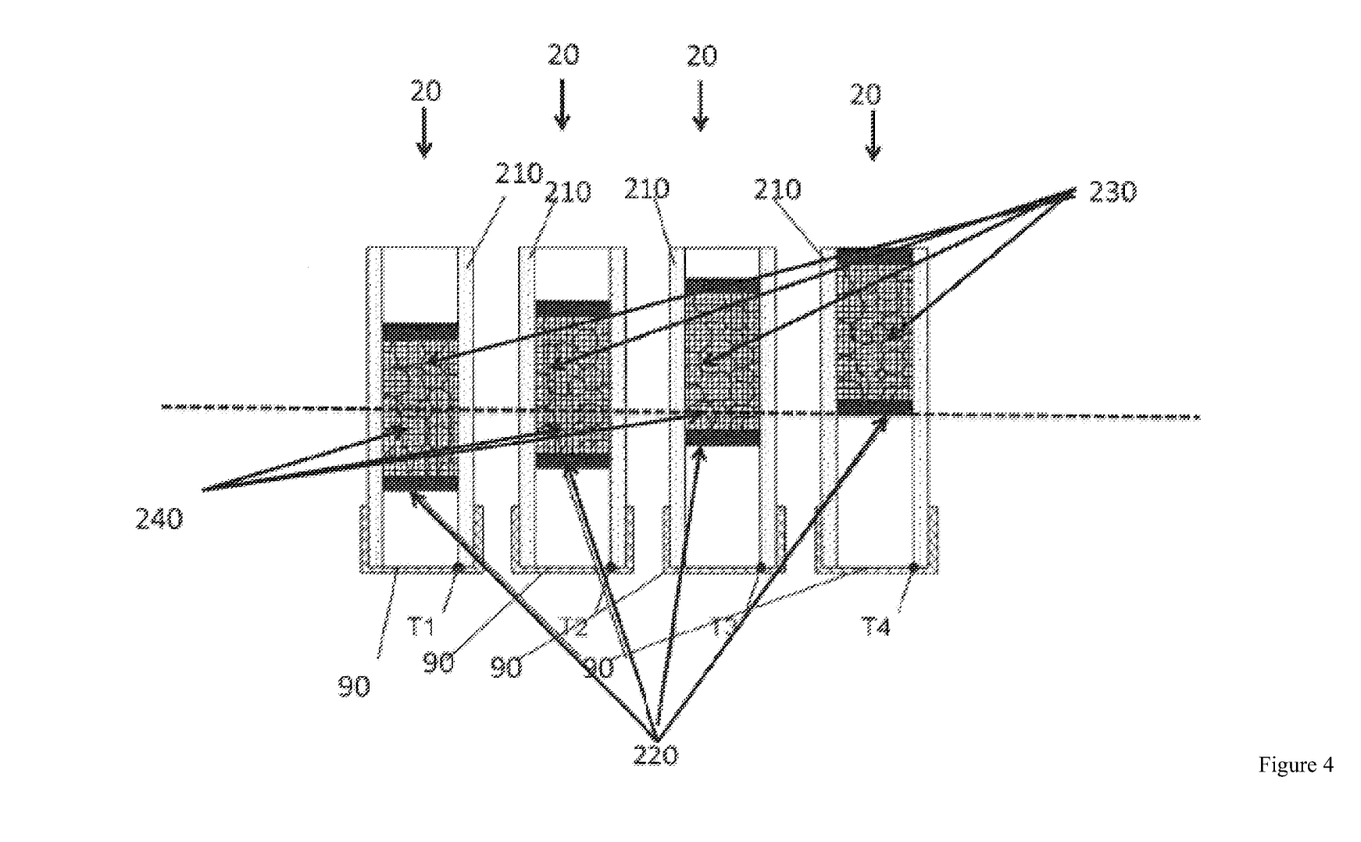
FIG. 4 examples of arrangements of catalyst material in respective recombination devices according to the present invention.

FIG. 4 shows examples of arrangements of catalyst material 150 in respective recombination devices 20 pursuant to the present invention. The respective combination devices 20 in this case have respective ceramic tubes 210 that each comprise catalyst material 150 in the interior. The respective catalyst material 150 is in this case respectively held in the ceramic tube 210 above and below by a lock 220. In relation to the image plane, the respective recombination devices 20 are held below by a retainer 90.

The first recombination device 20 left has a symmetric distribution of the catalyst material 150. The remaining recombination devices 20 each have an asymmetric distribution of the catalyst material 150, wherein a first partial amount 230 of the catalyst material 150 is respectively greater than a second partial amount 240. The greater first partial amount 230 is additionally respectively positioned at a greater distance from the retainer 90 than the second partial amount 240. The first and second partial amounts 230, 240 are each specified above and below a hatched centerline indicated in the respective recombination device 20.

A special case is shown on the far right, in that the entire catalyst material 150 is specified above the dotted centerline. In comparison to the symmetrical distribution of the catalyst material 150, the quantity of their catalyst material 150 to be distributed remains the same in all shown examples. Respective metrology points T1, T2, T3, T4 are shown on the retainer 90, wherein a temperature is measured on these during an operating mode. The greater the distance of the catalyst material 150 from the retainer 90, the lower the temperature measured at the metrology point of the retainer 90, which can also be referred to as an attachment, so that the following relationship is obtained in a test while operating the respective recombination devices 20: T4<T3<T2<T1.

REFERENCE SYMBOL

10 Recombination system
20 Recombination device
30 Dome
40 Outer wall
50 Inner wall
60 Ceiling region
70 Sidewall/wall
80 Opening region
90 Retainer
100 Jaw element
110 Water vapor
120 Condensing water
130 Locking element
140 Guide element
150 Catalyst material
160 Tapered region
170 Securing element
180 Region
190 Backfire safety element
200 Opening
210 Ceramic tube
220 Lock
230 First partial quantity
240 Second partial quantity

The invention claimed is:

1. Recombination system having a recombination device for catalytically recombining hydrogen and oxygen arising in storage batteries to form water, wherein the recombination device comprises at least one catalyst material in at least one subregion above a center line of the recombination device in relation to a position of a retainer of the recombination system for the recombination device has a first partial amount of the catalyst material, wherein the first partial amount is greater than a second partial amount of the catalyst material, which second partial amount is located originating from the center line of the recombination device toward the retainer, wherein the retainer is arranged in a ceiling region of the recombination system, a bottom region of the recombination system is located opposite with respect to the ceiling region, and the bottom region comprises an opening region, into which one or more gases are flowable from below into an interior of the recombination system.

2. Recombination system according to claim 1, wherein the retainer is arranged on a locking element of the recombination system, wherein the locking element comprises at least one guide element, so that a process medium, in particular water, is guided by the guide element to the at least one subregion of an inner region of the recombination system.

3. Recombination system according to claim 1, wherein the recombination device has at least one tapered region designed to be joined to the retainer on at least one side of the retainer.

4. Recombination system according to claim 1, wherein the retainer has at least one region designed to accommodate at least one backfire safety element and wherein the retainer comprises at least one securing element designed to be joined to the at least one tapered region of the recombination device.

5. Recombination system according to claim 1, wherein the retainer comprises at least one opening designed to functionally join the at least one backfire safety element to the recombination device.

6. Recombination system according to claim 1, wherein the first and second partial amounts of the catalyst material are joined to each other.

7. Recombination system according to claim 1, wherein the recombination device comprises a ceramic tube, wherein the first and second partial amounts are arranged in the ceramic tube.

8. A recombination device for use in a recombination system according to claim 1, wherein the recombination device comprises an asymmetrically distributed catalyst material, wherein a first partial amount of the catalyst material is greater than a second partial amount and wherein an average distance from the first partial amount to a retainer of the recombination system is greater than an average distance from the second partial amount to a retainer of the recombination system.

* * * * *